United States Patent
Shin et al.

(10) Patent No.: US 6,891,571 B2
(45) Date of Patent: May 10, 2005

(54) METHOD AND APPARATUS FOR IMPROVING VIDEO QUALITY

(75) Inventors: Chang Yong Shin, Seoul (KR); Dong Il Han, Seoul (KR)

(73) Assignee: LG Electronics Inc., Seoul (KR)

(*) Notice: Subject to any disclaimer, the term of this patent is extended or adjusted under 35 U.S.C. 154(b) by 519 days.

(21) Appl. No.: 10/008,626

(22) Filed: Dec. 6, 2001

(65) Prior Publication Data

US 2002/0075400 A1 Jun. 20, 2002

(30) Foreign Application Priority Data

Dec. 6, 2000 (KR) .......................................... 2000-73724

(51) Int. Cl.[7] .................................................. H04N 7/01
(52) U.S. Cl. ........................ 348/448; 348/700; 348/459
(58) Field of Search ................................ 348/452, 448, 348/700, 441, 459, 97, 558, 526, 911

(56) References Cited

U.S. PATENT DOCUMENTS

| | | | | |
|---|---|---|---|---|
| 5,461,420 A | * | 10/1995 | Yonemitsu et al. | 375/240.15 |
| 5,596,371 A | * | 1/1997 | Pakhchyan et al. | 348/452 |
| 5,689,301 A | * | 11/1997 | Christopher et al. | 348/97 |
| 6,008,848 A | * | 12/1999 | Tiwari et al. | 375/240.12 |
| 6,055,018 A | * | 4/2000 | Swan | 348/448 |
| 6,222,589 B1 | * | 4/2001 | Faroudja et al. | 348/448 |

* cited by examiner

*Primary Examiner*—Victor R. Kostak
(74) *Attorney, Agent, or Firm*—Lee, Hong, Degerman, Kang & Schmadeka (57) ABSTRACT

Disclosed is a video restoring apparatus and method thereof enabling to improve a video mode by interpolating field data. The present invention includes the steps of: identifying whether a scene on an image sequence is changed by receiving field data; detecting whether a 3:2 pull-down mode exists in the image sequence; generating a first interpolated frame by interleaving a field to be interpolated and adjacent fields each other when there is the 3:2 pull-down mode; generating a second interpolated frame by de-interlacing the field to be interpolated and the adjacent fields each other when there is not the 3:2 pull-down mode, and selectively outputting one of the first and second interpolated frames.

20 Claims, 6 Drawing Sheets

All variables are initialized to 0's every field.

```
FOR(i=1; i<Vertical_Size; i++){
    FOR(j=0; j<Horizontal_Size; j++){
        half_interval=|p(i-1,j,n+1)-p(i+1,j,n+1)|/2
        mean=(p(i-1,j,n+1)+p(i+1,j,n+1))/2 bd_(n+2&n)= |p(i,j,n+2)-p(i,j,n)|
        IF( |p(i,j,n)-mean|≤half_interval) THEN
            bd_(n+1&n)=0
        ELSE
            bd_(n+1&n)= |p(i,j,n)-mean|-half_interval
        END IF
        final_bd_(n+1&n)=min{bd_(n+2&n),bd_(n+1&n)}
        sum_(n+1&n)=sum_(n+1&n)-motion_(n+1&n)[0]
        FOR(k=0; k<6; k++)motion_(n+1&n)[k]=motion_(n+1&n)[k+1]
        IF(final_bd_(n+1&n)>THRESHOLD_motion) THEN
            motion_(n+1&n)[6]=1
        ELSE
            motion_(n+1&n)[6]=0
        END IF
        sum_(n+1&n)=sun_(n+1&n)+motion_(n+1&n)[6]
        IF(sum_(n+1&n)>3) THEN
            total_motion_(n+1&n)=total_motion_(n+1&n)+1
        END IF
        IF(|p(i,j,n+2)-mean|≤half_interval) THEN
            bd_(n+1&n+2)=0
        ELSE
            bd_(n+1&n+2)= |p(i,j,n+2)-mean|-half_interval
        END IF
        final_bd_(n+1&n+2)=min{bd_(n+2&n),bd_(n+1&n+2)}
        sum_(n+1&n+2)=sum_(n+1&n+2)-motion_(n+1&n+2)[0]
        FOR(k=0; k<6; k++) motion_(n+1&n+2)[k]=motion_(n+1&n+2)[k+1]
        IF(final_bd_(n+1&n+2)>THRESHOLD_motion) THEN
            motion_(n+1&n+2)[6]=1
        ELSE
            motion_(n+1&n+2)[6]=0
        END IF
        sum_(n+1&n+2)=sum_(n+1&n+2)+motion_(n+1&n+2)[6]
        IF(sum_(n+1&n+2)>3) THEN
            total_motion_(n+1&n+2)=total_motion_(n+1&n+2)+1
        END IF
    }
}
```

FIG. 5B

IF( |total_motion_(n+1&n)−total_motion_(n+1&n+2)| <THRESHOLD$_{diff\_motion}$ ) THEN
   "The scene change did not occurred."

ELSE
   IF(total_motion_(n+1&n)<THRESHOLD$_{total\_motion}$ ) THEN
     total_motion_(n+1&n)=0
   END IF    IF(total_motion_(n+1&n+2)<THRESHOLD$_{total\_motion}$ ) THEN
     total_motion_(n+1&n+2)=0
   END IF    IF(total_motion_(n+1&n)<total_motion_(n+1&n+2) THEN
     "The scene was abruptly changed in the (n+2)th field."
   ELSE IF(total_motion_(n+1&n)>total_motion_(n+1&n+2)) THEN
     "The scene was abruptly changed in the (n+1)th field."
   ELSE
     "The scene change did not occurred."
   END IF
END IF

FIG. 6

All variables are initialized to 0's every field.

FOR(i=1; i<Vertical_Size; i++){
   FOR(j=0; j<Horizontal_Size; j++){
     half_interval= |p(i−1,j,n+1)−p(i+1,j,n+1)|/2
     mean=(p(i−1,j,n+1)+p(i+1,j,n+1))/2

IF( |p(i,j,n)−mean|≤half_interval) and(|p(i,j,n+2)−mean|≤half_interval))
       THEN bd_(n+2&n)=0
     ELSE
       bd_(n+2&n)=| p(i,j,n+2)−p(i,j,n)|
     END IF
     sum_(n+2&n)=sum_(n+2&n)−motion_(n+2&n)[0]
     FOR(k=0; k<6; k++)motion_(n+2&n)[k]=motion_(n+2&n)[k+1]
     IF(final_bd_(n+2&n)>THRESHOLD$_{motion}$ ) THEN
       motion_(n+2&n)[6]=1
     ELSE
       motion_(n+2&n)[6]=0
     END IF
     sum_(n+2&n)=sun_(n+2&n)+motion_(n+2&n)[6]
     IF(sum_(n+2&n)>3) THEN
       total_motion_(n+2&n)=total_motion_(n+2&n)+1
     END IF
   }
}

METHOD AND APPARATUS FOR IMPROVING VIDEO QUALITY

CROSS REFERENCE TO RELATED ART

This application claims the benefit of Korean Patent Application No. 2000-73724, filed on Dec. 6, 2000, the contents of which is hereby incorporated by reference in its entirety.

BACKGROUND OF THE INVENTION

1. Field of the Invention

The present invention relates to a video restoring apparatus and method thereof enabling to improve a video quality, and more particularly, to a video restoring apparatus and method thereof enabling to improve a video quality by interpolating field data.

2. Background of the Related Art

Generally a computer monitor plays a video by a progressive scan mode, while a general television plays a video by an interlacing mode. In this case, the interlacing is a method that divides a frame (TV screen of National Television System Committee, NTSC, requires 30 frames per second) into two fields consisting of odd field and even field and then generates one frame by sequentially scanning the two fields. And, the progressive scanning is carried out by storing the two fields in a temporary buffer and then by generating one frame.

The computer monitor displays a video using the progressive scan mode instead of the interlacing mode. Before displaying a stored video of which one frame is divided into two fields, the two fields are combined into one frame again by "de-interlacing".

The "de-interlacing" is disclosed in U.S. Pat. No. 4,876, 596, U.S. Pat. No. 5,550,592, U.S. Pat. No. 5,563,651, U.S. Pat. No. 5,596,371, and U.S. Pat. No. 5,689,301.

U.S. Pat. No. 4,876,596 relates to a method of interpolating a video using line information of the current field itself repeatedly. Yet, the interpolating method of U.S. Pat. No. 4,876,596 is realized by a simple hardware but fails to prevent a degraded quality of the video.

U.S. Pat. No. 5,550,592 relates to an interpolation method of inserting the previous field data in the current field line data directly without motion compensation. The interpolation method disclosed in U.S. Pat. No. 5,550,592 is realized by a simple hardware as well, but the image quality is degraded after the interpolation.

U.S. Pat. No. 5,563,651 relates to an intra-field interpolation method using linear line interpolation of the current field itself. The interpolation method disclosed in U.S. Pat. No. 5,563,651 is realized by a simple hardware as well, but the image quality is degraded after the interpolation.

U.S. Pat. No. 5,596,371 relates to a motion compensation interpolation method of carrying out interpolation by finding motion vectors. The interpolation method disclosed in U.S. Pat. No. 5,596,371 enables to improve an image quality after interpolation, but utilizes complicated hardware.

And, U.S. Pat. No. 5,689,301 relates to an adaptive motion interpolation method of interpolating the current field in accordance with the estimated motion attained by estimating a degree of motion. Thus, U.S. Pat. No. 5,689,301 is realized by a relatively simple hardware and enables to improve an image quality after interpolation. Yet, the interpolation method disclosed in U.S. Pat. No. 5,689,301 fails to detect a motion of an object moving instantly or at a specific speed in a system detecting a motion between frames. Moreover, the interpolation method disclosed in U.S. Pat. No. 5,689,301, in case of detecting a motion between simple frames, results in an excessive motion detection so as to reduce an image resolution after interpolation. Therefore, the entire image quality is degraded. A plurality of memory devices or complicated processing procedures are required for detecting the motion of the object precisely. Therefore, the entire structure of the hardware gets complicated as well as the manufacturing cost of the corresponding circuit is increased.

Unfortunately, the interpolation methods according to the related arts realized by simple hardware degrade an image quality after interpolation.

Moreover, the interpolation methods according to the related arts require complicated structure of hardware to improve an image quality after interpolation.

Furthermore, the interpolation methods according to the related arts require a plurality of memory devices or complicated processing procedures for detecting the motion of the object precisely, whereby the entire structure of the hardware gets complicated as well as the manufacturing cost of the corresponding circuit is increased.

SUMMARY OF THE INVENTION

Accordingly, the present invention is directed to a video restoring apparatus and method thereof that substantially obviates one or more problems due to limitations and disadvantages of the related art.

An object of the present invention is to provide a simple-structured video restoring apparatus and method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method and an apparatus according to the present invention identifies an input image generated from a film sequence by estimating inter-field motion information from information on previous and future fields by taking a current field to be interpolated as a reference, and carries out a field interleaving or a de-interlacing on the current field to be interpolated based upon the result of identification.

In one aspect of the present invention, a method of restoring a video according to the present invention includes the steps of: identifying whether a scene on an image sequence is changed; detecting whether a 3:2 pull-down mode exists in the image sequence; generating a first interpolated frame by interleaving a field to be interpolated and adjacent fields each other when there is the 3:2 pull-down mode; generating a second interpolated frame by de-interlacing the field to be interpolated and the adjacent fields each other when there is not the 3:2 pull-down mode; and selectively outputting one of the first and second interpolated frames.

In another aspect of the present invention, an apparatus for restoring a video includes a scene transition detecting unit for outputting a scene transition detecting signal by detecting a motion of image from field data, a 3:2 pull-down mode detecting unit for detecting whether a 3:2 pull-down mode exists in the field data and outputting a first control signal on the basis of a corresponding detection result and the scene transition detecting signal, a field interleaver for generating a first interpolated frame by interleaving the field data by receiving the first control signal when the 3:2 pull-down mode is detected, a de-interlacer for generating a second interpolated frame by de-interlacing the field data in accordance with the first control signal when the 3:2 pull-down mode is not detected, and a multiplexer for selecting to output the first or second interpolated frame in accordance with the first control signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
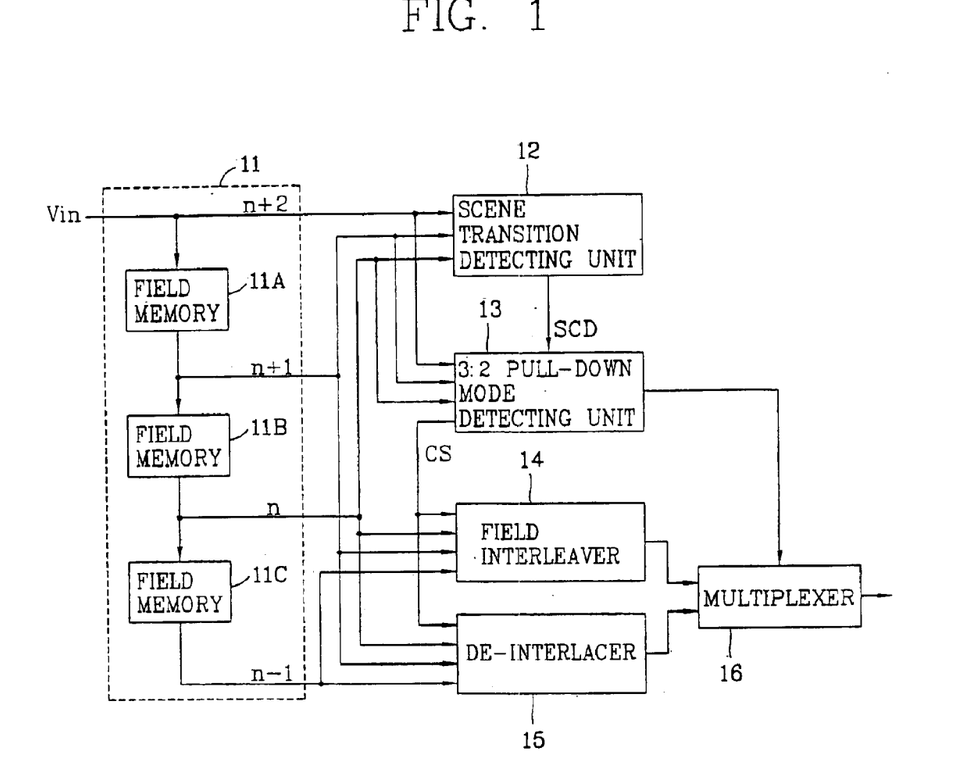
FIG. 1 illustrates a block diagram of a video restoring apparatus according to the present invention.

FIG. 1 illustrates a block diagram of a video restoring apparatus according to the present invention.

Referring to FIG. 1, a field data providing unit 11 provides data of previous fields n and n−1, a current field n+1, and a future field n+2 by constructing three field memories 11A to 11C. A scene transition detecting unit 12 detects a motion between the fields adjacent to the current field n+1 by receiving the field data from the field data providing unit 11. On the basis of the detected motion, the scene transition detecting unit 12 outputs a scene transition detecting signal by identifying whether a scene of an inputted image sequence is changed on the basis of the detected motion. A 3:2 pull-down mode detecting unit 13 detects whether a 3:2 pull-down mode exists in the inputted image sequence by receiving the field data from the field data providing unit 11.

The 3:2 pull-down mode detecting unit 13 also outputs a corresponding first control signal CS by referring to a result of the detection and the scene transition detecting signal. A field interleaver 14 is driven when the first control signal CS is inputted from the 3:2 pull-down mode detecting unit 13 and generates an interpolated frame by interleaving the field n+1 to be interpolated with the adjacent fields n−1, n, and n+2. A de-interlacer 15 detects a motion of the current field n+1 in accordance with the first control signal CS. Based on the detected motion, the de-interlacer 15 generates an interpolated frame by de-interlacing the field n+1 to be interpolated with the adjacent fields n−1, n, and n+2. A multiplexer 16 selectively outputs the frame generated from the field interleaver 14 in accordance with the first control signal CS or the frame generated from the de-interlacer 15. The construction of the 3:2 pull-down mode detecting unit 13 is explained in detail as follows.

Figure 2:
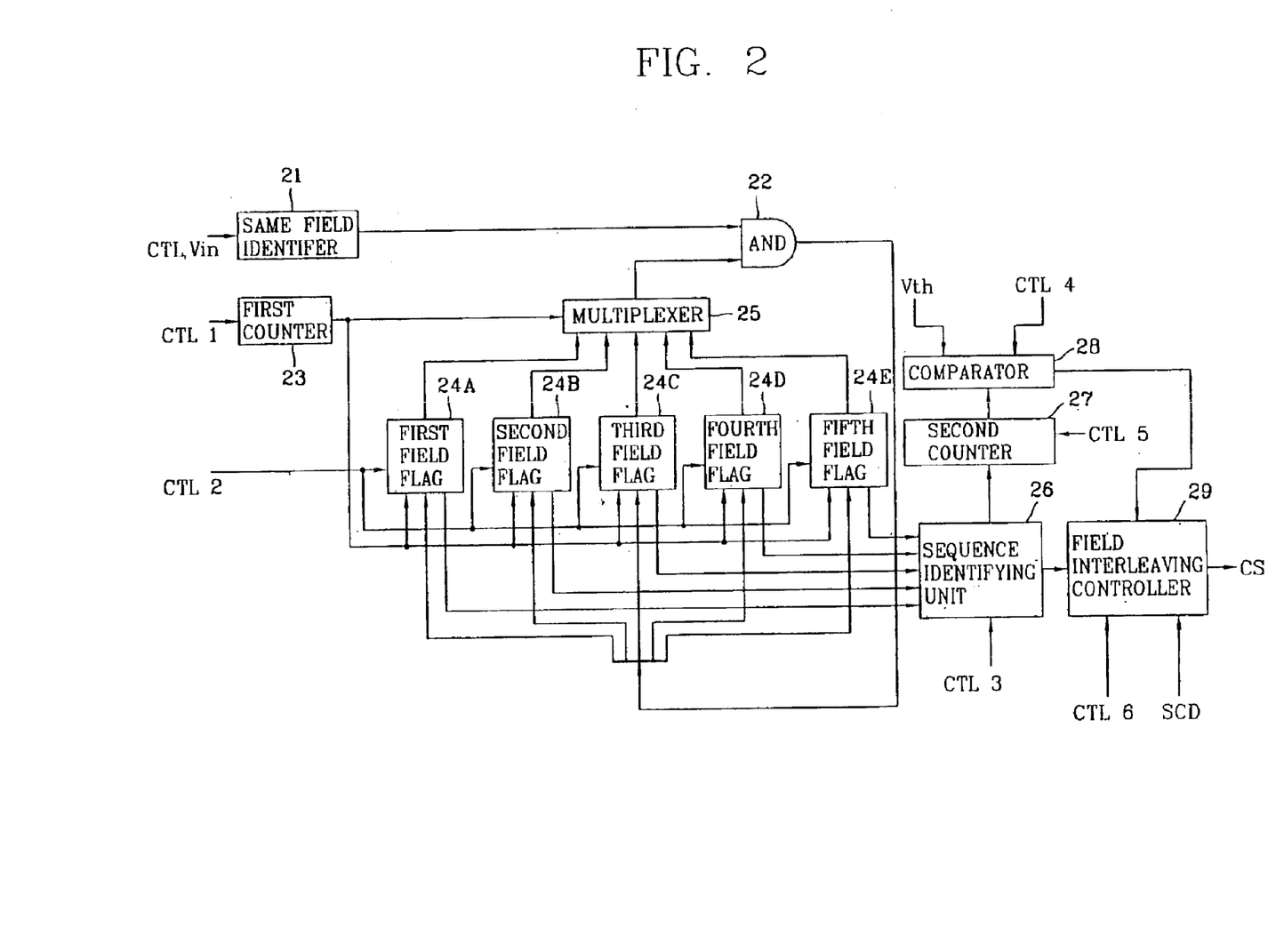
FIG. 2 illustrates a block diagram of a 3:2 pull-down mode detecting unit in FIG. 1.

FIG. 2 is a block diagram illustrating a structure of a 3:2 pull-down mode detecting unit in FIG. 1.

Referring to FIG. 2, a same field identifier 21 identifies whether the current field n+1 is the same as the previous field n by analyzing a video input signal Vin and outputs a corresponding logic signal. An AND gate 22 combines the logic signal and an output signal of the multiplexer 25. A first counter 23 outputs a second control signal so as to control a selective operation of the multiplexer 25 and an operation of field flags 24A to 24E in accordance with a field of the video input signal Vin. Field flags 24A to 24E stores an output value of the AND gate 22 in order by receiving the second control signal of the first counter 23. A multiplexer 25 selects output signals of the field flags 24A to 24E in order by receiving the second control signal of the first counter 23. The multiplexer 25 also supplies the other input terminal of the AND gate 22 with the selected output signals of the field flags 24A to 24E. A sequence identifying unit 26 identifies whether a value recorded in the field flags 24A to 24E is equal to a value recorded in the previous image sequence. Second counter 27 counts the number that the sequence identifying unit 26 identifies the same. A comparator 28 compares a count value of the second counter 27 to a predetermined threshold value Vth. A field interleaving controller 29 outputs the first control signal CS so as to properly compensate a video input by referring to a comparison result of the comparator 28 and the scene transition detecting signal SCD.

Operation of the above-constructed video restoring apparatus according to the present invention in FIG. 1 and FIG. 2 is explained in detail as follows.

First of all, the field data providing unit 11 stores the video input signal Vin successively using the three field memories 11A to 11C connected in series, and detects whether the scene is changed or provides data so as to detect whether the 3:2 pull-down mode exists. In this case, the field data mean video data of the previous fields n and n−1, current (reference) field n+1, and future field n+2.

The scene transition detecting unit 12 receives the video data of the field n+1 to be interpolated currently, previous field n, and future field n+2 from the field data providing unit 11. When a scene on the inputted image sequence is changed, the scene transition detecting unit 12 outputs the corresponding scene transition detecting signal SCD to the 3:2 pull-down mode detecting unit 13. And, the scene transition detecting unit 12 is explained in detail as follows.

In order to detect whether the scene is changed, the scene transition detecting unit 12 carries out "low pass filtering" on the video signal so as to remove noises included in pixels of the current (reference), previous, and future fields n+1, n, and n+2. And, the scene transition detecting unit 12 carries out "binary mapping" by detecting brightness differences between the previous and future fields n and n+2 located spatially over or below each pixel of the current field n+1, and then carries out "median filtering".

Thereafter, the scene transition detecting unit 12 counts the part, where the motion between the current and previous fields n+1 and n is detected, over the entire image. Moreover, the scene transition detecting unit 12 counts the part, where the motion between the current and future fields n+1 and n+2 is detected, over the entire image. Namely, the scene transition detecting unit 12 identifies whether the scene is changed by comparing the motion count values between the respective fields. For instance, the scene transition detecting unit 12 identifies whether the scene is changed on the basis of a comparison result between motion quantities of the previous and current fields n and n+1 and the current and future fields n+1 and n+2, a comparison result between motion quantities of the previous and current fields n and n+1 and the previously stored threshold value, or a comparison result between motion quantities of the current and future fields n+1 and n+2 and the threshold value.

Thereafter, the 3:2 pull-down mode detecting unit 13 detects whether the 3:2 pull-down mode exists in the image sequence (field data), and then outputs the corresponding first control signal CS to the field interleaver 14 and the de-interlacer 15 by referring to the detection result and the scene transition detection signal SCD outputted from the scene transition detecting unit 12.

The field interleaver 14 and the de-interlacer 15 receives the first control signal CS to interleave or de-interlace the field data (previous fields n−1 and n, current field n+1, and future field n+2), thereby generates interpolated frames. The 3:2 pull-down mode detecting unit 13 is explained in detail as follows.

In order to detect the 3:2 pull-down mode, the 3:2 pull-down mode detecting unit 13 carries out "low pass filtering" on the video signal so as to remove noises included in pixels of the current (reference), previous, and future fields n+1, n/n−1, and n+2. And, the 3:2 pull-down mode detecting unit 13 carries out "binary mapping" by detecting brightness differences between the previous and future fields n and n+2 located spatially over or below each pixel of the current field n+1, and then carries out the "median filtering".

Thereafter, the 3:2 pull-down mode detecting unit 13 counts the part, where the motion between the previous fields n and n−1 and the future field n+2 is detected, over the entire image. Namely, the 3:2 pull-down mode detecting unit 13 detects whether the 3:2 pull-down mode exists on the basis of the comparison result by comparing the motion count value between the respective fields to the previously set-up threshold value.

If a result attained by carrying out the 3:2 pull-down mode detecting procedures consecutively on the respective fields satisfies one of "10000", "01000", "00100", "00010", and "00001", it is detected that the output sequence is repeated every five fields. This is explained in detail as follows.

First of all, the same field identifier 21 outputs a logic signal of "1" if it is determined that the current field n+1 is equal to the previous field n by analyzing the video input signal Vin using the counter (not shown in the drawing) and threshold value. Otherwise, the same field identifier 21 outputs a logic signal of "0".

The logic signal outputted from the same field identifier 21 is ANDed successively with the values of the field flags 24A to 24E inputted through the multiplexer 25, whereby the ANDed values are stored in the field flags 24A to 24E in order.

The sequence identifying unit 26 identifies whether the values stored in the field flags 24A to 24E are equal to the values recorded in the previous image sequence. In this case, the counter 27 counts the number identified as same by the sequence identifying unit 26 and the comparator 28 compares the count value of the counter 27 to the previously set-up threshold value Vth.

Herefter, the field interleaving controller 29 outputs the first control signal CS by referring to the comparison result of the comparator 28 and the scene transition detecting signal SCD outputted from the scene transition detecting unit 12 so as to compensate the input video properly. Namely, if it is judged that the output sequence is repeated every five fields as many as the previously set-up count by referring to the comparison result from the comparator 28, the interleaving controller 29 identifies that the input image sequence (field data) consists of the 3:2 pull-down mode and outputs the corresponding first control signal CS. In this case, operation of the de-interlacer 15 becomes off and that of the field interleaver 14 becomes on so that the interpolated frame is generated by interleaving the current, previous, and future fields n+1, n, and n+2 in accordance with the output sequence.

Thus, the 3:2 pull-down mode detecting unit 13 actuates the field interleaver 14 in accordance with the output sequence and keeps observing the sequences detected every five fields. If the output sequence becomes "00000", the 3:2 pull-down mode detecting unit 13 turns off the field interleaver 14 and turns on the de-interlacer 15 with the first control signal CS. In this case, the de-interlacer 15 receives the first control signal CS so as to generate the interpolated frame by de-interlacing the current field n+1 and the adjacent fields (previous fields n−1 and n and future field n+2). Thereafter, the 3:2 pull-down mode detecting unit 13 returns to its initial state so as to carry out the process of detecting the 3:2 pull-down mode. In this case, it is judged that the field to be currently interpolated is interleaved with a field having no relation reciprocally if the 3:2 pull-down mode exists in the input image sequence. Thus, it is highly possible that the image sequence is edited. Therefore, the 3:2 pull-down mode detecting unit 13 turns off the field interleaver 14 with the first control signal CS and turns on the de-interlacer 15. The 3:2 pull-down mode detecting unit 13 then returns to its initial state so as to carry out the process of detecting the 3:2 pull-down mode.

Moreover, when none of the five kinds of the output sequences is detected, the 3:2 pull-down mode detecting unit 13 keeps turning off the field interleaver 14 and turning on the de-interlacer 15. Hence, the 3:2 pull-down mode detecting unit 13 makes the current field to be interpolated stably.

As mentioned in the above explanation, the 3:2 pull-down mode detecting unit 13 precisely and finely detects the 3:2 pull-down mode from the image sequence in connection with the scene transition detecting unit 12. The 3:2 pull-down mode detecting unit 13 drives the field interleaver 14 to carry out the field interleaving only if identifying that the 3:2 pull-down mode is detected. Otherwise, the 3:2 pull-down mode detecting unit 13 drives the de-interlacer 15 only so as to carry out the de-interlacing only.

Namely, the field interleaver 14 generates the interpolated frame by interleaving the current, previous, and future fields n+1, n, and n+2 with each other in accordance with the first control signal CS outputted from the 3:2 pull-down mode detecting unit 13.

The de-interlacer 15, when the 3:2 pull-down mode is not detected, is driven in accordance with the first control signal CS outputted from the 3:2 pull-down mode detecting unit 13. In this case, the de-interlacer 15 generates the interpolated frame by interleaving the current field n+1, previous fields n and n−1, and future field n+2 with each other.

Subsequently, the multiplexer 16 selects to output the frame interpolated by the field interleaver 14 when the 3:2 pull-down mode is detected in accordance with the first control signal CS of the 3:2 pull-down mode detecting unit 13. If the 3:2 pull-down mode is not detected, the multiplexer 16 selects to output the frame interpolated by the de-interlacer 15.

Besides, as shown in FIG. 2, control signals CTL1 to CTL6 applied to the respective units are signals provided by a system controller(not shown in the drawing).

Figure 3:
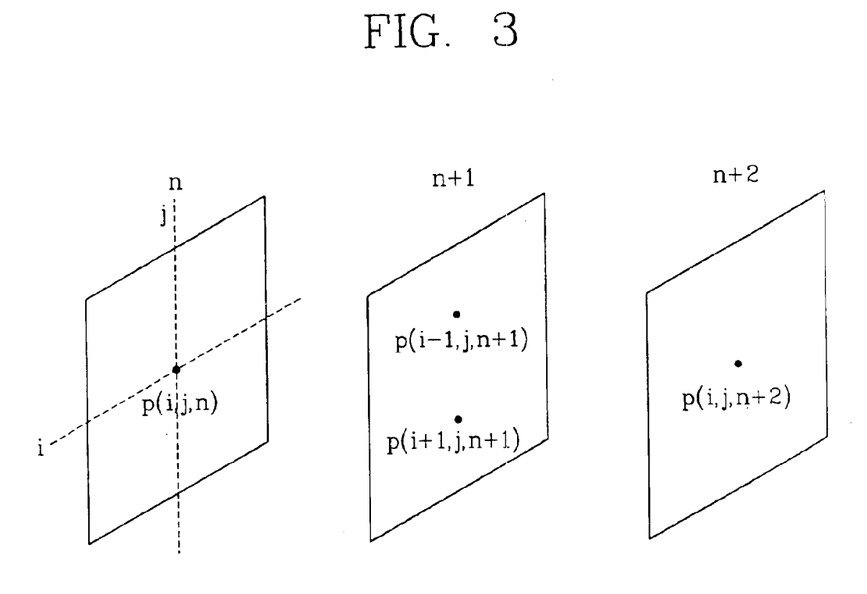
FIG. 3 illustrates a diagram for explaining three-consecutive field data used for scene transition and 3:2 pull-down mode detection.

FIG. 3 illustrates a diagram for explaining three-consecutive field data used for the scene transition and the 3:2 pull-down mode detection. For the "3:2 pull-down ", a rate transformer(not shown in the drawing) is required when the image sequence consisting of twenty-four frames is transformed into sixty fields to transfer. Namely, the same frame is divided into two fields to transmit three times and then the following frame is divided into two fields to transmit twice. For instance, if a specific frame is transmitted in order of three consecutive fields, i.e. top, bottom, and top fields, the following frame is transmitted as two consecutive fields of bottom and top fields. By repeating such a process consecutively, it is able to rate-transform the original image of twenty-four frames into sixty fields to transmit. Such a transmission method is called the "3:2 pull-down".

Figures 4A, 4B:
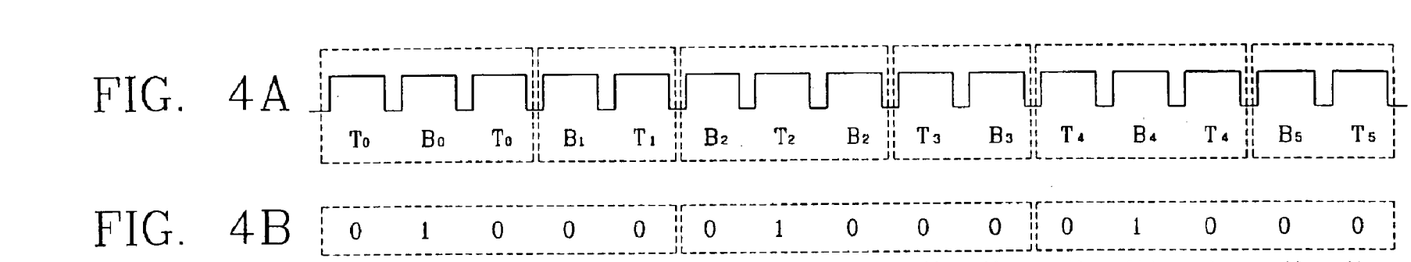
FIG. 4A illustrates a timing chart of a vertical synchronizing signal and top/bottom fields.
FIG. 4B illustrates a timing chart of an output sequence of a sequence identifying unit.
Figure 4C:
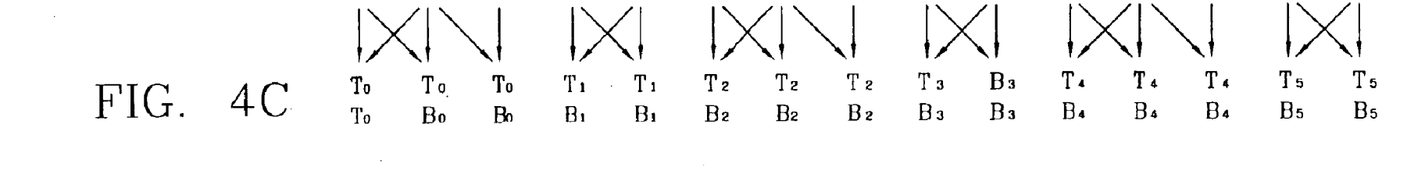
FIG. 4C illustrates a timing chart of an interpolated frame.

FIG. 4A illustrates a timing graph of a vertical synchronizing signal and top/bottom fields, FIG. 4B illustrates a timing chart of an output sequence of the sequence identifying unit 26, and FIG. 4C illustrates a timing chart of the interpolated frame.

Figure 5A:
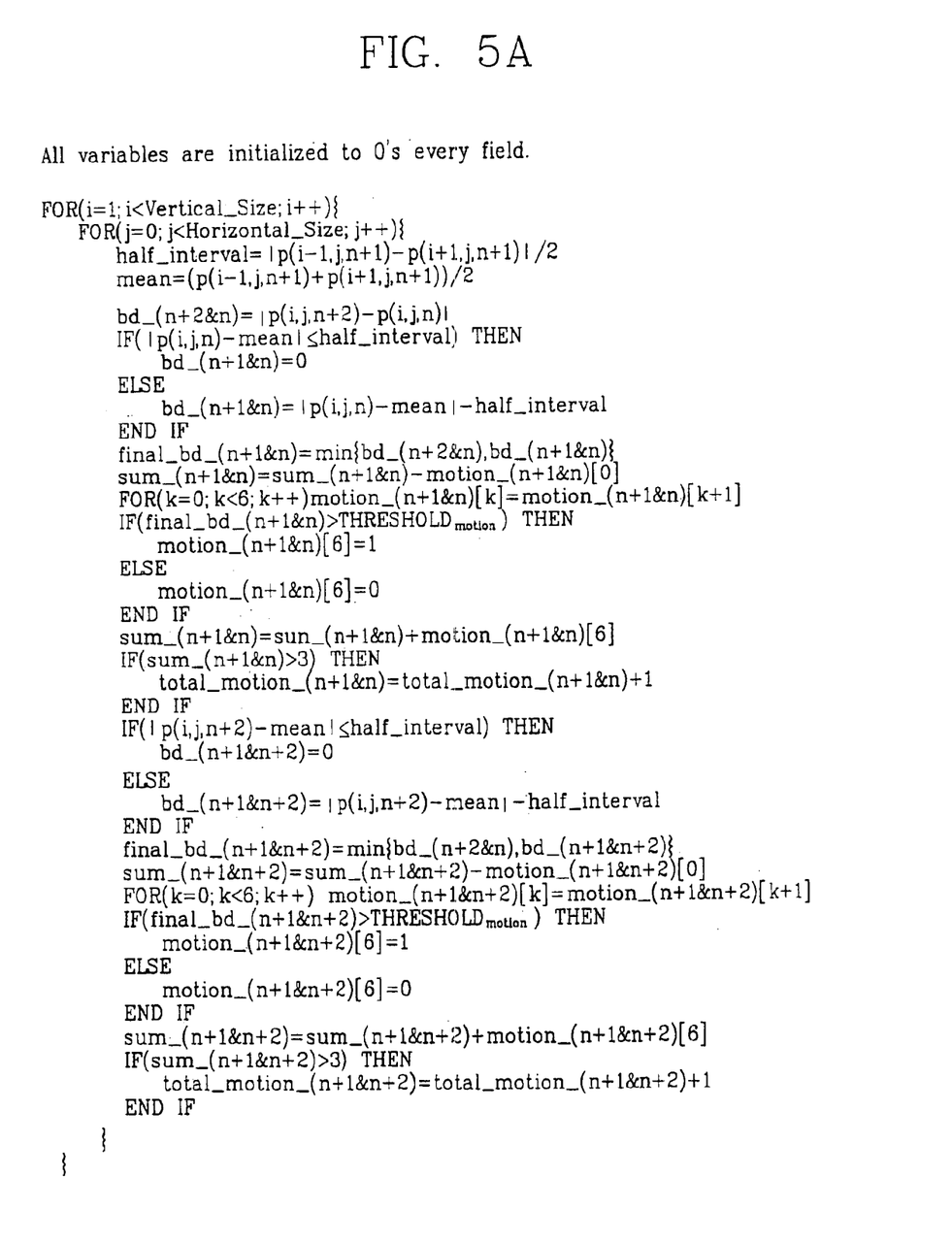
FIG. 5A and FIG. 5B illustrate algorithms for a scene transition detecting method according to the present invention.
Figure 5B:
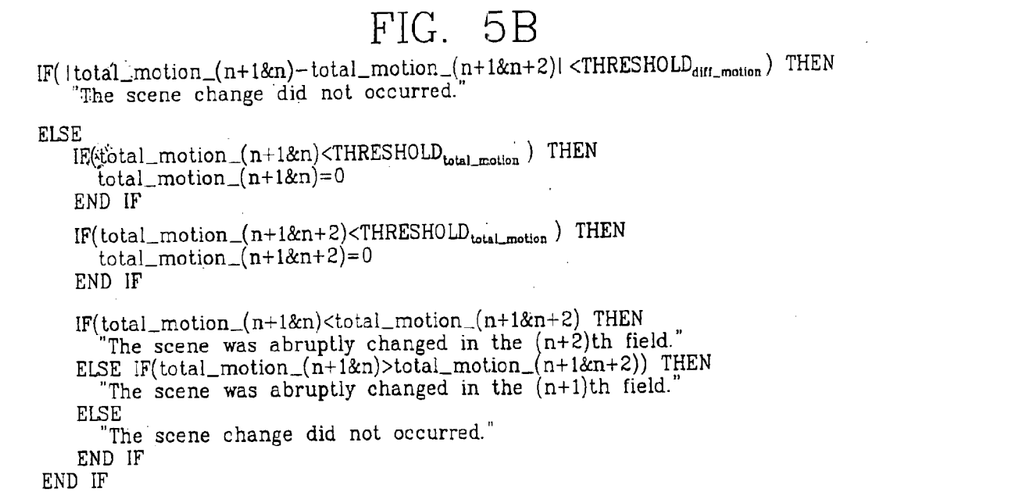

FIG. 5A and FIG. 5B illustrate algorithms for a scene transition detecting method according to the present invention.

Referring to FIG. 5A and FIG. 5B, shown is an algorithm for detecting whether the scene is changed when scene transition is detected by comparing motion count values of the respective fields are compared to each other.

Figure 6:
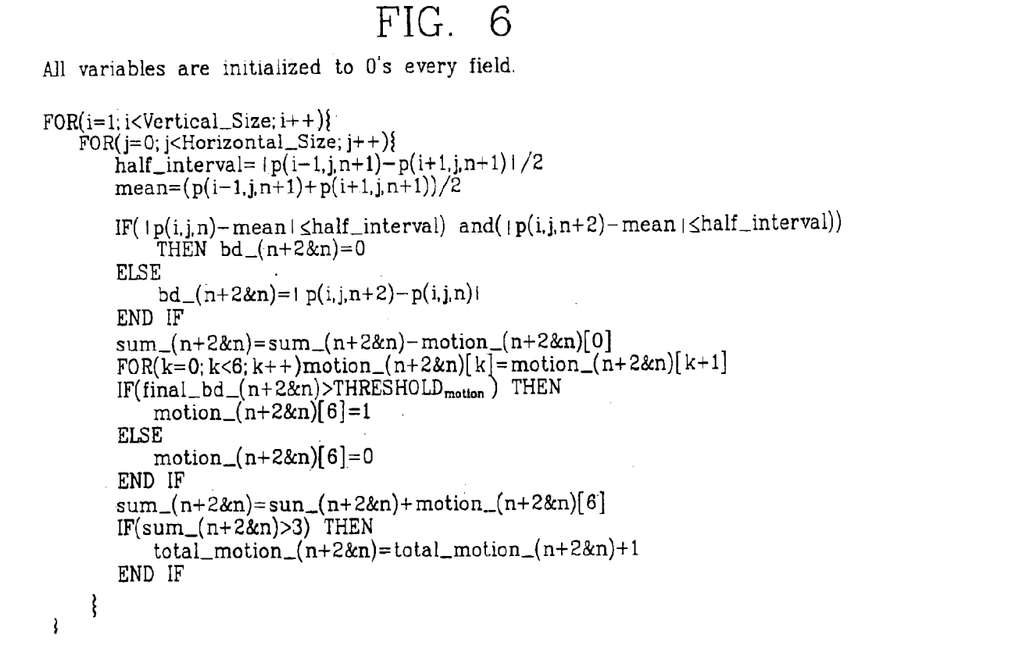
FIG. 6 illustrates an algorithm for a 3:2 pull-down mode detecting method according to the present invention.

FIG. 6 illustrates an algorithm for a pull-down mode detecting method according to the present invention.

Referring to FIG. 6, an algorithm for detecting the 3:2 pull-down mode is shown when the 3:2 pull-down mode is detected on the basis of the comparison result attained by comparing motion count values between the respective fields to the previously set-up threshold value.

As mentioned in the above description, the scene transition occurrence and the 3:2 pull-down mode are detected from the current, previous, and future field data. In accordance with the detecting result, the field interleaving is carried out on the image sequence to which the 3:2 pull-down mode is applied. For the image sequence to which the 3:2 pull-down mode is not applied, the de-interlacing is carried out so as to generate and selectively output one of the interpolated frames.

Accordingly, the video restoring apparatus and method thereof enables to provide a video of high quality.

Moreover, the video restoring apparatus and method thereof realizes a simple structure of a circuit, thereby enabling to reduce its manufacturing cost.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of restoring a video, the method comprising:
   identifying whether a scene on an image sequence is changed;
   detecting whether a 3:2 pull-down mode exists in the image sequence;
      generating a first interpolated frame by interleaving a field to be interpolated and at least two adjacent fields with each other when there is the 3:2 pull-down mode;
      generating a second interpolated frame by de-interlacing the field to be interpolated and at least two adjacent fields with each other when there is not the 3:2 pull-down mode; and
   selecting one of the first and second interpolated frames based upon whether a 3:2 pull-down mode was detected.

2. The method of claim 1, wherein identifying whether a scene on an image sequence is changed is carried out by detecting motions between the adjacent fields.

3. The method of claim 1, wherein the first interpolated frame is selected when the 3:2 pull-down mode exists and the second interpolated frame is selected when the 3:2 pull-down mode does not exist.

4. The method of claim 1, wherein the field to be interpolated comprises a current field and the at least two adjacent fields comprise a previous field and a future field.

5. The method of claim 1, wherein the 3:2 pull-down mode is detected by comparing a motion count value between a previous field and at least one future fields to a predetermined threshold value.

6. The method of claim 5, wherein the motion count value is determined by counting a part, where motion between the previous field and the at least one future field is detected, over an entire image.

7. The method of claim 1, wherein detecting whether a 3:2 pull-down mode exists comprises:
   identifying whether the current field is equal to a previous field by analyzing a video input signal and outputting a corresponding identification signal;
   ANDing the identification signal with an output signal of a multiplexer;
   outputting a first control signal for controlling an operation of the multiplexer in accordance with a field of the video input signal;
   storing the ANDed values in order upon receiving the first control signal;
   selecting the stored values in order in accordance with the first control signal;
   identifying whether the recorded values are equal to recorded values of a previous sequence;
   counting a number of occurrences that the stored values are equal to those of the previous sequence;
   comparing the counted number of occurrences to a predetermined threshold value; and
   outputting a second control signal according to the comparison result and a scene transition detecting signal.

8. An apparatus for restoring a video, the apparatus comprising:
   a scene transition detecting unit adapted to detect a motion of image from field data;

a 3:2 pull-down mode detecting unit adapted to detect whether a 3:2 pull-down mode exists in the field data and output a first control signal on the basis of the 3:2 pull-down mode detection result and the scene transition detecting result;

a field interleaver adapted to generate a first interpolated frame by interleaving the field data with data from at least two adjacent fields upon receiving the first control signal when the 3:2 pull-down mode is detected;

a de-interlacer adapted to generate a second interpolated frame by de-interlacing the field data with data from at least two adjacent fields in accordance with the first control signal when the 3:2 pull-down mode is not detected; and a multiplexer selecting adapted to select one of the first interpolated frame and the second interpolated frame in accordance with the first control signal.

9. The apparatus of claim 8, wherein the multiplexer is adapted to select the first interpolated frame when the 3:2 pull-down mode is detected and to select the second interpolated frame when the 3:2 pull-down mode is not detected.

10. The apparatus of claim 8, wherein the field data are outputted from a field data providing unit comprising a plurality of field memories.

11. The apparatus of claim 10, wherein the plurality of the field memories comprise three field memories connected in series.

12. The apparatus of claim 8, wherein the field data comprise image data of a current field, a previous field, and a future field.

13. The apparatus of claim 8, wherein the scene transition detecting unit is further adapted to output a scene transition detecting signal when a scene on an image sequence is changed.

14. The apparatus of claim 8, wherein the 3:2 pull-down mode detecting unit detects a 3:2 pull-down mode by comparing a motion count value between a previous field and at least one future fields to a predetermined threshold value.

15. The apparatus of claim 14, wherein the motion count value is determined by counting a part, where a motion between the previous field and the at least one future field is detected, over an entire image.

16. The apparatus of claim 8, wherein the 3:2 pull-down mode detecting unit comprises:

a same field identifier adapted to identify whether a current field is equal to a previous field by analyzing a video input signal and outputting a corresponding identification signal;

an AND gate adapted to AND the identification signal with an output signal of the multiplexer;

a first counter adapted to output a second control signal the multiplexer;

field flags adapted to store an output value of the AND gate in order upon receiving the second control signal;

the multiplexer adapted to select output signals of the field flags in order in accordance with the second control signal and supply the AND gate with the selected output signals;

a sequence identifying unit adapted to identify whether a value stored in the field flags is equal to a value stored in the previous image sequence;

a second counter adapted to count the number of times that the sequence identifying unit identifies the same sequence;

a comparator adapted to compare a count value of the second counter to a predetermined threshold value; and a field interleaving controller adapted to output the first control signal according to a comparison result of the comparator and the scene transition detecting result.

17. A method of restoring a video, the method comprising:

identifying a scene transition on an image sequence by receiving consecutive field data and by detecting a motion between adjacent fields;

detecting whether a 3:2 pull-down mode exists in the field data and generating a first interpolated frame by interleaving the field data with data from at least two adjacent fields on the basis of the 3:2 pull-down mode detection result and the scene transition result;

generating a second interpolated frame by de-interlacing the field data with data from at least two adjacent fields if at least one of a sequence outputted by consecutively detecting the 3:2 pull-down mode for each field is zero, the field to be interpolated is interleaved with a field having no relation reciprocally, and none of previously set-up output sequences are detected; and selecting one of the first and second interpolated frames.

18. The method of claim 17, wherein the field data comprise image data of a current field, a previous field, and a future field.

19. The method of claim 17, wherein identifying a scene transition on an image sequence comprises:

counting a part, where motion between a current field and at least one previous fields is detected, over an entire image;

counting a part, where motion between the current and a future field is detected, over the entire image; and identifying whether the scene is changed by comparing the motion count values to each other.

20. The method of claim 17, wherein the previously set-up output sequences comprise the five-digit combinations "10000", "01000", "00100", "00010", and "00001".

* * * * *